United States Patent [19]
Rizvi et al.

[11] Patent Number: 5,734,896
[45] Date of Patent: Mar. 31, 1998

[54] RECOVERY OF A REMOTELY INITIATED DISTRIBUTED PREPARED TRANSACTION BY STATUS REPORT FROM A SECOND DATABASE TO AN EXTERNAL COORDINATOR

[75] Inventors: Hasan Rizvi, Fremont; Anupam Bhide, Foster City, both of Calif.

[73] Assignee: Oracle Corporation, Redwood Shores, Calif.

[21] Appl. No.: 641,330

[22] Filed: Apr. 30, 1996

[51] Int. Cl.$^6$ ................................................ G05F 17/30
[52] U.S. Cl. .............................. 395/618; 395/610
[58] Field of Search ................................ 395/618, 610

[56] References Cited

U.S. PATENT DOCUMENTS

| | | | |
|---|---|---|---|
| 4,853,843 | 8/1989 | Ecklund | 395/619 |
| 5,274,803 | 12/1993 | Dubin et al. | 395/610 |
| 5,423,037 | 6/1995 | Hvasshovd | 395/618 |
| 5,469,575 | 11/1995 | Madduri | 395/200.56 |
| 5,504,899 | 4/1996 | Raz | 395/610 |
| 5,504,900 | 4/1996 | Raz | 395/610 |

OTHER PUBLICATIONS

Stamos et al, A Low–Cost Atomic Commit Protocol, PROC Ninth Symposium on Reliable Distributed Systems, 9–12 Oct. 1990, pp. 66–75, Oct. 12, 1990.

Suardi et al, Execution of Extended Multidatabase SQL, PORC Ninth International Conference on Data Engineering, 19–23 Apr. 1993, pp. 641–650, Apr. 23, 1993.

*Primary Examiner*—Wayne Amsbury
*Attorney, Agent, or Firm*—Lowe, Price, LeBlanc & Becker

[57] ABSTRACT

A computer system and method are provided in which an existing database instance is able to report the status of an externally initiated distributed transaction that existed in another database instance that has crashed. The existing database instance is also able to roll back or commit the changes made by the externally initiated distributed transaction in response to instructions from the external coordinator process that initiated the transaction. Because the existing database instance is able to perform these services, the external coordinator process does not have to wait for the crashed database instance to be revived to complete the distributed transaction.

14 Claims, 4 Drawing Sheets

RECOVERY OF A REMOTELY INITIATED DISTRIBUTED PREPARED TRANSACTION BY STATUS REPORT FROM A SECOND DATABASE TO AN EXTERNAL COORDINATOR

FIELD OF THE INVENTION

The present invention relates to recovery after a crash of a database, and more specifically, to recovery of remotely initiated distributed transactions.

BACKGROUND OF THE INVENTION

In typical database systems, users store, update and retrieve information by submitting commands to a database application. To be correctly processed, the commands must comply with the database language that is supported by the database application. One popular database language is known as Structured Query Language (SQL).

A logical unit of work that is comprised of one or more database language statements is referred to as a transaction. In a database server, a memory area called the System Global Area (SGA) is allocated and one or more processes are started to execute one or more transactions. The combination of the SGA and the processes executing transactions is called a database instance.

To ensure the integrity of a database, the database must show all of the changes made by a transaction, or none of the changes made by the transaction. Consequently, none of the changes made by a transaction are permanently applied to a database until the transaction has been fully executed. A transaction is said to "commit" when the changes made by the transaction are made permanent to a database.

There are two general categories of transactions: local transactions and distributed transactions. A local transaction is coordinated entirely within a single database instance. Consequently, a database instance knows when a local transaction has been fully executed, and is able to commit local transactions without any additional information from outside of the database instance. A local transaction therefore goes directly from an active state to a committed state when the transaction is fully executed.

A distributed transaction is not performed entirely within a single database instance. For example, a distributed transaction may include two child transactions. The first child transaction may be executed in a first database instance, and the second child transaction may be executed in the second database instance.

A distributed transaction is not fully executed until all of its child transactions have been fully executed. Consequently, when a database instance completes the execution of a child transaction, it does not automatically commit the child transaction. Rather, the database instance places the child transaction into a "prepared" state. The child transaction remains in the prepared state until the database instance is notified about whether the child transaction should be committed or rolled back.

For example, the first database instance mentioned above cannot commit the changes made by the first child transaction to the database when the first child transaction is fully executed until the first database is informed that the second child transaction is fully executed. Therefore, the fist database instance places the first child transaction in a prepared state after fully executing the first child transaction. Similarly, the second database instance places the second child transaction in the prepared state when the second transaction is fully executed.

A coordinating process is a process that is responsible for coordinating a distributed transaction. Coordinating processes may be part of a database system, or may reside external to the database system. Coordinating processes that reside external to a database are referred to herein as external coordinating processes. External coordinating processes are useful for coordinating the child transactions of transactions that require operations inside two or more different types of databases.

The coordinating process for a distributed transaction assigns the various child transactions of the distributed transaction to the entities that will be responsible for performing the child transactions (the "child transaction executors"). After assigning the child transactions, the coordinating process requests status updates from the child transaction executors. When the coordinating process has determined that all of the child transaction executors have prepared their respective child transactions, the coordinating process informs all of the child transaction executors to commit the child transactions. If any child transaction executor is unable to complete its child transaction, then the coordinating process informs all of the child transaction executors to roll back their respective child transactions.

Before a coordinating process can instruct all child process executors to commit their respective child transactions, the coordinating process must know whether all of the child transactions are prepared. Unfortunately, one or more of the child transaction executors could be database instances that have subsequently crashed. As a result, the coordinating process may not be able to immediately determine whether the child transactions assigned to the crashed instances were prepared at the time of the crash.

When a database instance crash occurs, a coordinating process that has assigned a child transaction to the crashed database instance can either wait for the crashed instance to be recovered, or assume that the child transaction(s) in the crashed instance were not prepared. Because it is crucial that users have continuous access to data, database systems typically will not wait for the revival of a crashed database instance. Therefore, the decision of whether to commit or roll back the child transaction(s) must be made without additional information from the crashed instance.

However, if the coordinating process assumes that the child transactions were not prepared, then the coordinating process must instruct all of the child transaction executors associated with the distributed transaction to roll back their respective child transactions. This results in a significant waste of time and computer resources if the child transactions assigned to the crashed instance had in fact been prepared at the time of the crash.

Based on the foregoing, it is clearly desirable to employ a recovery technique that allows data to be immediately available after the crash of a database instance. It is further desirable to provide a mechanism for determining whether remotely initiated transactions that existed in a crashed instance were prepared at the time of the crash without waiting to revive the crashed instance.

SUMMARY OF THE INVENTION

A computer system is provided in which an existing database instance is able to report the status of an externally initiated distributed transaction that existed in another database instance that has crashed. The existing database instance is also able to roll back or commit the changes made by the externally initiated distributed transaction in response to instructions from the external coordinator process that initiated the transaction. Because the existing database instance is able to perform these services, the external coordinator process does not have to wait for the crashed database instance to be revived to complete the distributed transaction.

According to one aspect of the invention, a method is provided for recovering after a crash of a first database instance that had access to a particular database. According to the method, prepared transaction information is stored on a storage device. The prepared transaction information identifies any distributed transactions that had been prepared by the first database instance prior to when the crash occurred. A second database instance responds to a status request issued by an external coordinator process by (1) reading the prepared transaction information from the storage device, and (2) sending a message to the external coordinator process that identifies at least one of the distributed transactions that had been prepared by the first database instance prior to when the crash occurred.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for recovering a remotely coordinated distributed transaction after a crash of a database instance are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
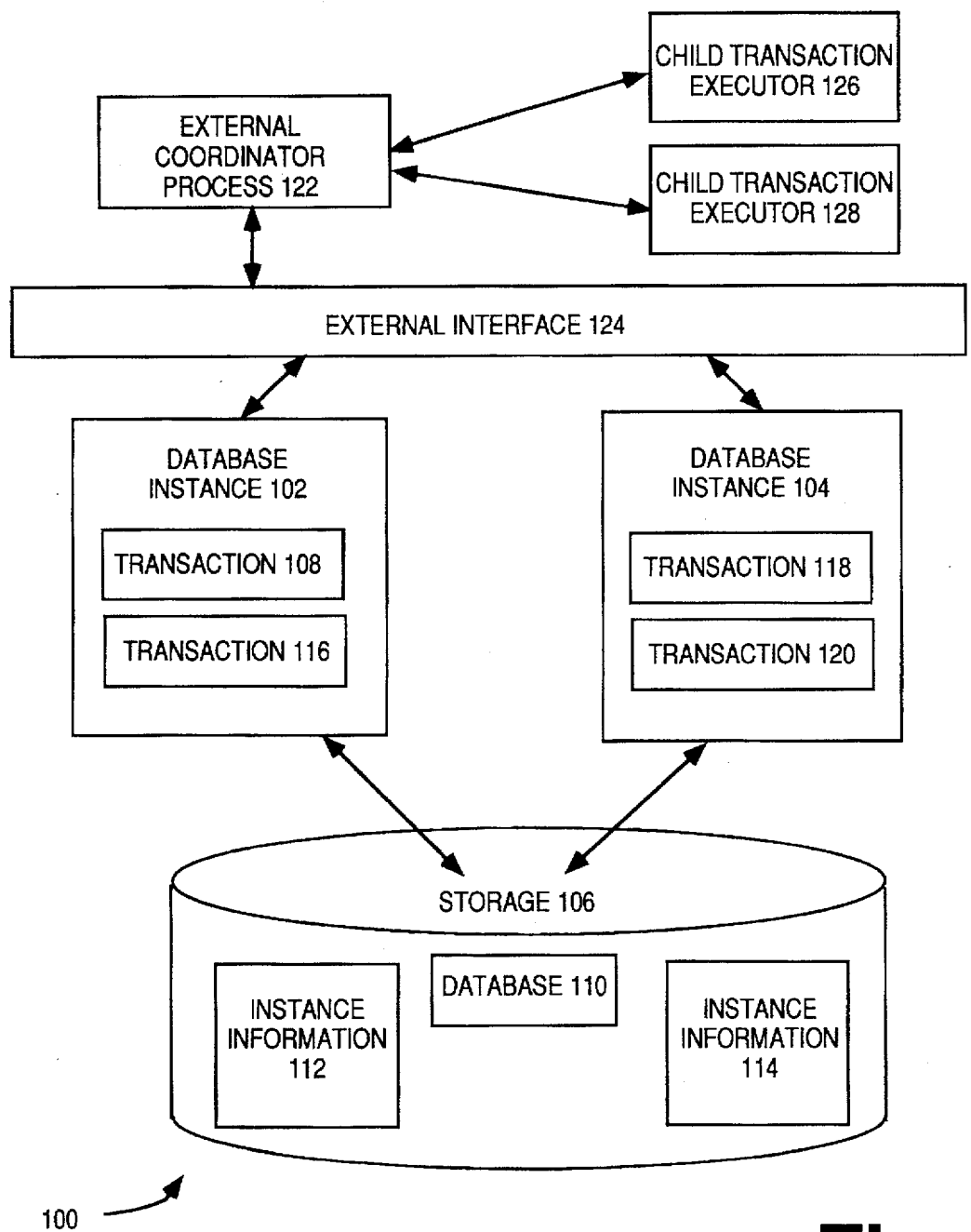
FIG. 1 is a block diagram illustrating a computer system according to an embodiment of the invention.

Referring to FIG. 1, it is a block diagram of a computer system 100 according to an embodiment of the invention. Computer system 100 is a multiprocessing system that is currently executing two database instances 102 and 104, a external coordinator process 122 and two child transaction executors 126 and 128. These various processes may, for example, be distributed among various workstations connected through a network, or among various processing nodes in a single multi-tasking machine.

Although database instances 102 and 104 may be executing on different nodes within system 100, both database instances 102 and 104 can access the same database 110 on a storage device 106. To support shared access to storage 106, computer system 100 may be a shared everything system, a shared disk system, or a shared nothing system that includes a mechanism for shared disk support.

Storage device 106 generally represents one or more mechanisms capable of storing information. For example, storage device 106 may include one or more disk drives, memory banks or any combination of static and dynamic storage mechanism. The present invention is not limited to any particular mechanisms or combination of mechanisms for storing data.

Database instance 102 includes two transactions 108 and 116, and database instance 104 includes two transactions 118 and 120. Information about the current status of transactions in each database instance is stored on storage 106. Specifically, storage 106 includes instance information 112 that specifies the current status of transactions 108 and 116, and instance information 114 that specifies the current status of transactions 118 and 120.

External coordinator process 122 generally represents a process, external to any database instance, that is responsible for coordinating execution of a distributed transaction. Communication between external coordinator process 122 and database instances 102 and 104 is performed through an external interface 124. For example, external coordinator process 122 may be the TUXEDO program generally available from BEA Systems Inc., Fremont, Calif., and external interface 124 may be the XA interface described in "Distributed Transaction Processing: The XA Specification", available from X/Open Company Ltd., United Kingdom.

The external coordinator process 122 assigns a child transaction through external interface 124 to a particular database instance. External interface 124 isolates the external coordinator process 122 from the database instances 102 and 104 that access database 110. The external coordinator process 122 is not aware of how many database instances are actually connected to database 110.

For the purposes of explanation, it shall be assumed that external coordinator process 122 is responsible for coordinating execution of a distributed transaction ("TRANSACTION_A"), and that external coordinator process 122 has assigned child transactions TRANSACTION_A1, TRANSACTION_A2, TRANSACTION_A3 to child transaction executor 126, child transaction executor 128, and through external interface 124, respectively. Specifically, it shall be assumed that transaction 108 of database instance 102 is TRANSACTION_A3 that has been assigned by external coordinator process 122 through external interface 124. Also for the purposes of explanation, it shall be assumed that database instance 102 crashes at some point in time after external coordinator process 122 has assigned TRANSACTION_A3 through external interface 124.

INSTANCE RECOVERY

When an instance of a database crashes, a transaction recovery mechanism must return the database to a consistent state. Crash recovery typically involves two phases: cache recovery and transaction rollback. During cache recovery, the transaction recovery mechanism applies to the database changes made by transactions in the crashed instance that had not been applied to the database prior to when the crash occurred. Such changes include, for example, changes that had been made to copies of portions of the database that were stored in dynamic memory at the time of the crash. During rollback, the transaction recovery mechanism removes from the database any changes that were made by transactions in the crashed instance that were active at the time the instance crashed.

When the transaction recovery mechanism encounters a transaction that was prepared at the time of the crash, the transaction recovery mechanism does not have enough information to know what to do with the prepared transaction. Specifically, changes made by prepared transactions should be committed to the database only if all associated child transactions related to the prepared transaction are successfully completed by the respective child transaction executors. Conversely, changes made by prepared transactions should be rolled back if any associated child transaction is not successfully completed. Because the transaction recovery mechanism does not immediately know how to handle prepared transactions, the transaction recovery mechanism copies information about the prepared transactions to the database.

Figure 2:
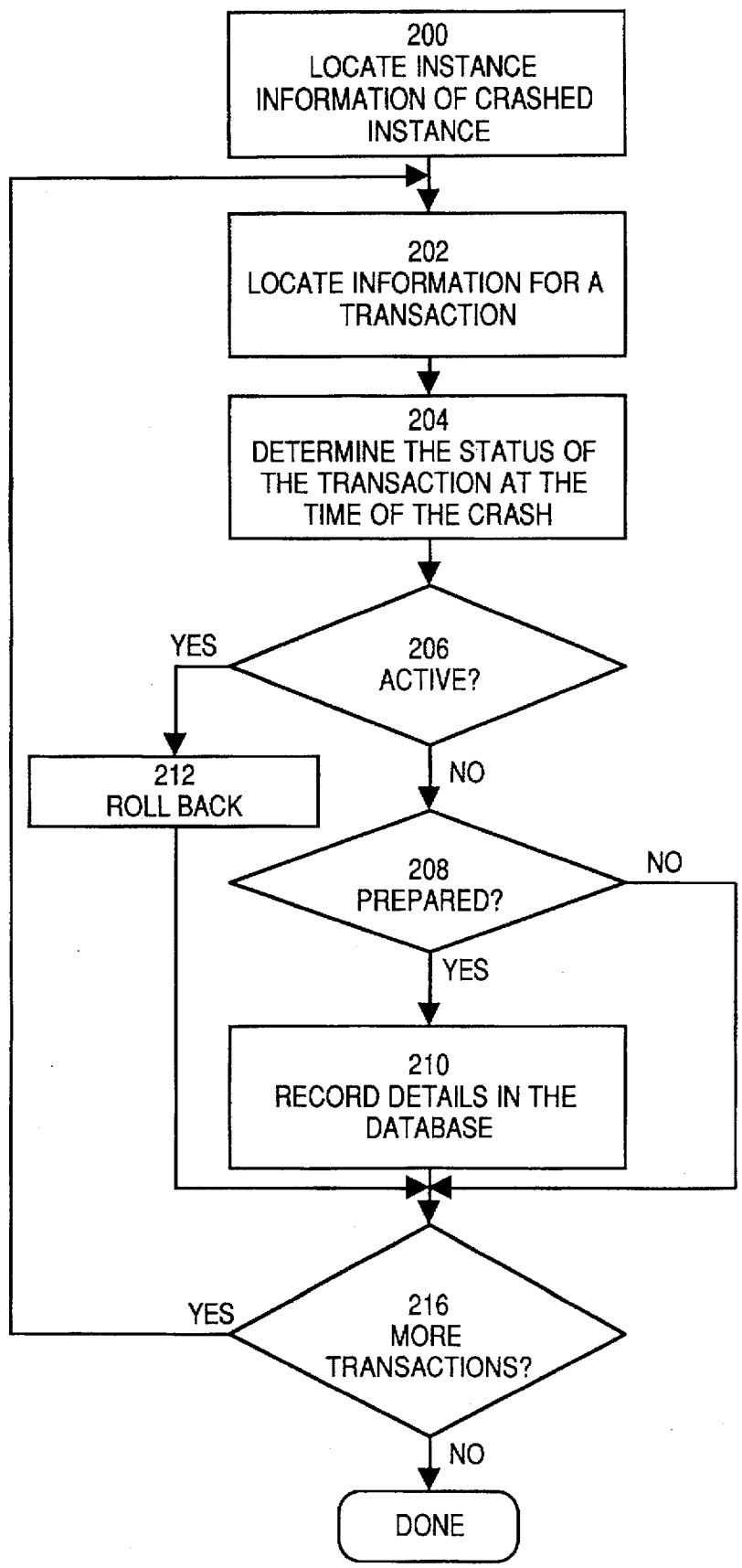
FIG. 2 is a flow chart illustrating steps for recovering a crashed database instance.

FIG. 2 is a flow chart illustrating the operations performed by a transaction recovery mechanism during the rollback phase of crash recovery according to one embodiment of the present invention. At step 200, the crash recovery information locates instance information corresponding to the crashed instance. In the present example, step 200 would involve locating the instance information 112 that corresponds to the database instance 102 that crashed.

At step 202, the transaction recovery mechanism locates information about a transaction that existed in database instance 102. This information may include, for example, an entry in a transaction table stored in instance information 112. At step 204, the status of the identified transaction at the time of the crash is determined. If the transaction was active, control passes from step 206 to step 212 where the changes made by the transaction are rolled back. If the transaction was prepared, control passes from step 208 to step 210 where details about the prepared transaction are copied to the database. If the transaction was neither prepared nor active, control passes to step 216.

At step 216, it is determined whether all of the transactions in the crashed instance have been processed. If them are more transactions to be processed, control passes back to step 202. Otherwise, the rollback phase of transaction recovery is done.

The recovery process described above is merely one example of how an instance may be recovered. The order of the various steps may vary from implementation to implementation. For example, one embodiment may identify all of the prepared transactions and copy information about the prepared transactions to database 110 before rolling back any active transactions. Another embodiment may perform rollback in multiple phases, rolling back only up to a predetermined number of changes for each active transaction during each rollback phase. The present invention is not limited to any particular sequence of transaction recovery operations.

Once the information about the prepared transactions has been moved to database 110, the information is available to all database instances that have access to database 110. The information about the prepared transactions of a crashed transaction shall be collectively referred to as the "prepared transaction information". In the illustrated example, database instance 102 will have access to prepared transaction information that indicates which transactions in database instance 102 had been prepared by database instance 102 at the time that database instance 102 crashed.

PROXY REPORTING

Because database instance 104 is accessible through external interface 124 and has access to prepared transaction information from database instance 102, database instance 104 can answer status requests issued by external coordinator process 122 about transaction 108. The technique through which one database instance reports on externally initiated distributed transactions that existed in another database instance is referred to herein as proxy reporting.

In the present example, external coordinator process 122 must be able to determine whether transaction 108 was in the prepared state when database instance 102 crashed in order to know whether transaction 108 and its siblings (TRANSACTION_A1 and TRANSACTION_A1) should be committed. To make this determination, external coordinator process 122 issues a status request to external interface 124. In response to the status request, database instance 104 performs the steps illustrated in FIG. 3.

Figure 3:
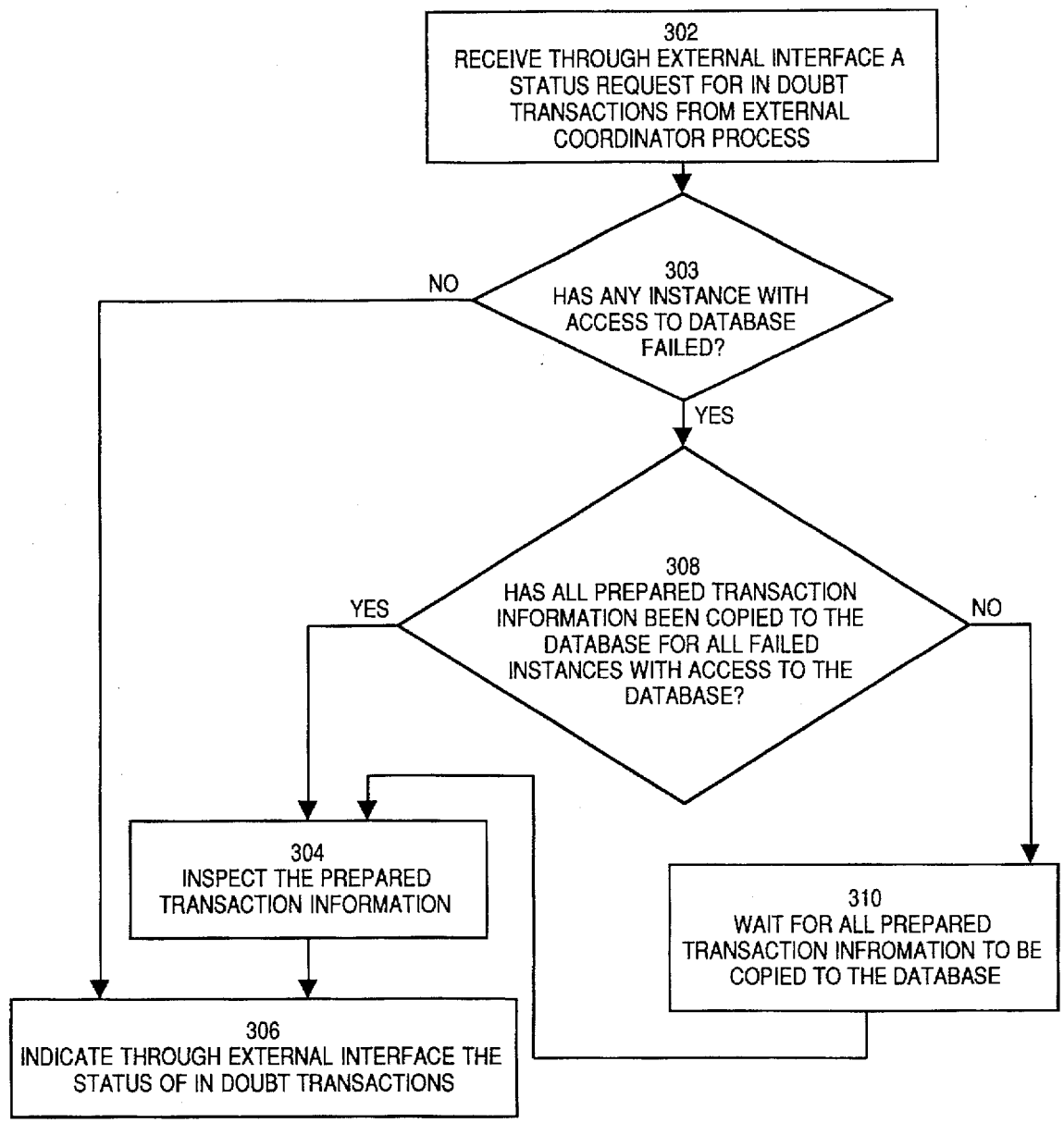
FIG. 3 is a flow chart illustrating steps for proxy reporting according to an embodiment of the invention.

Referring to FIG. 3, database instance 104 receives through the external interface 124 the status request from the external coordinator process 122. Typically, the status request is for the status of all transactions that are "in doubt". An "in doubt" transaction is a distributed transaction that has been assigned to a database by an external coordinator process that has not yet been rolled back or committed. Thus, a status request from external coordinator process 122 could involve other transactions initiated by external coordinator process 122 through external interface 124 in addition to transaction 108. In the XA interface, such a status request may be in the form of a XARECOVER call.

At step 303, database instance 104 determines whether any instance with access to database 110 has failed. If no instance to database 110 has failed, database instance 102 reports the status of any in doubt transactions that exist in database instance 104 (step 306). Otherwise, control proceeds to step 308.

At step 308, database instance 102 determines whether all prepared transaction information has been copied to the database 110 for all failed instances with access to database 110. In the present example, database instance 102 has failed. The prepared transaction information for database instance 102 will eventually be copied to database 110, as described above (step 210 of FIG. 2). However, at the time external coordinator process 122 transmits the status request, all of the prepared transaction data for database instance 102 may not yet have been copied to database 110. If all of the prepared transaction information has not yet been copied, database instance 104 waits for the prepared transaction information to be completely copied (step 310).

When all of the prepared transaction information for database instance 102 has been completely copied to database 110, database instance 104 inspects the prepared transaction information associated with database instance 102 (step 304). Transaction 108 will be among the prepared transactions identified in the prepared transaction information if transaction 108 was prepared at the time database instance 102 crashed. Conversely, if transaction 108 is not identified in the prepared transaction information, transaction 108 had not been fully executed by database instance 102.

At step 306, database instance 104 indicates through the external interface 124 the status of all of the "in doubt" transactions, including any prepared transactions listed in the prepared transaction information for database instance 102. Thus, database instance 104 acts as a proxy for database instance 102 in that the status report issued by database instance 104 includes the status of prepared transactions that existed in database instance 102.

According to one embodiment of the invention, the status request issued by the external coordinator process 122 may include a flag to indicate whether the database instance that will respond to the status request should wait for the completion of the prepared data information transfer phase of recovery operations of any failed instances. If the flag indicates that the responding database instance should wait, control proceeds as described above. If the flag indicates that the responding database instance should not wait, control passes directly from step 303 to step 304 if a database instance has failed.

REMOTELY COORDINATED DISTRIBUTED TRANSACTION RECOVERY

External coordinator process 122 is responsible for indicating to the various child transaction executors what they should do with their respective child transactions after the child transactions have been completed. Specifically, when external coordinator process 122 determines that all of the child transactions of TRANSACTION_A (i.e. transaction 108, TRANSACTION_A1 and TRANSACTION_A2) have been completed successfully, external coordinator process 122 transmits a message to each of the child transaction executors to indicate that the child transactions should be committed. Similarly, external coordinator process 122 may instruct all of the child transaction executors to roll back their respective child transactions as soon of the external coordinator process 122 is made aware that any of the child tasks could not be completed successfully.

Figure 4:
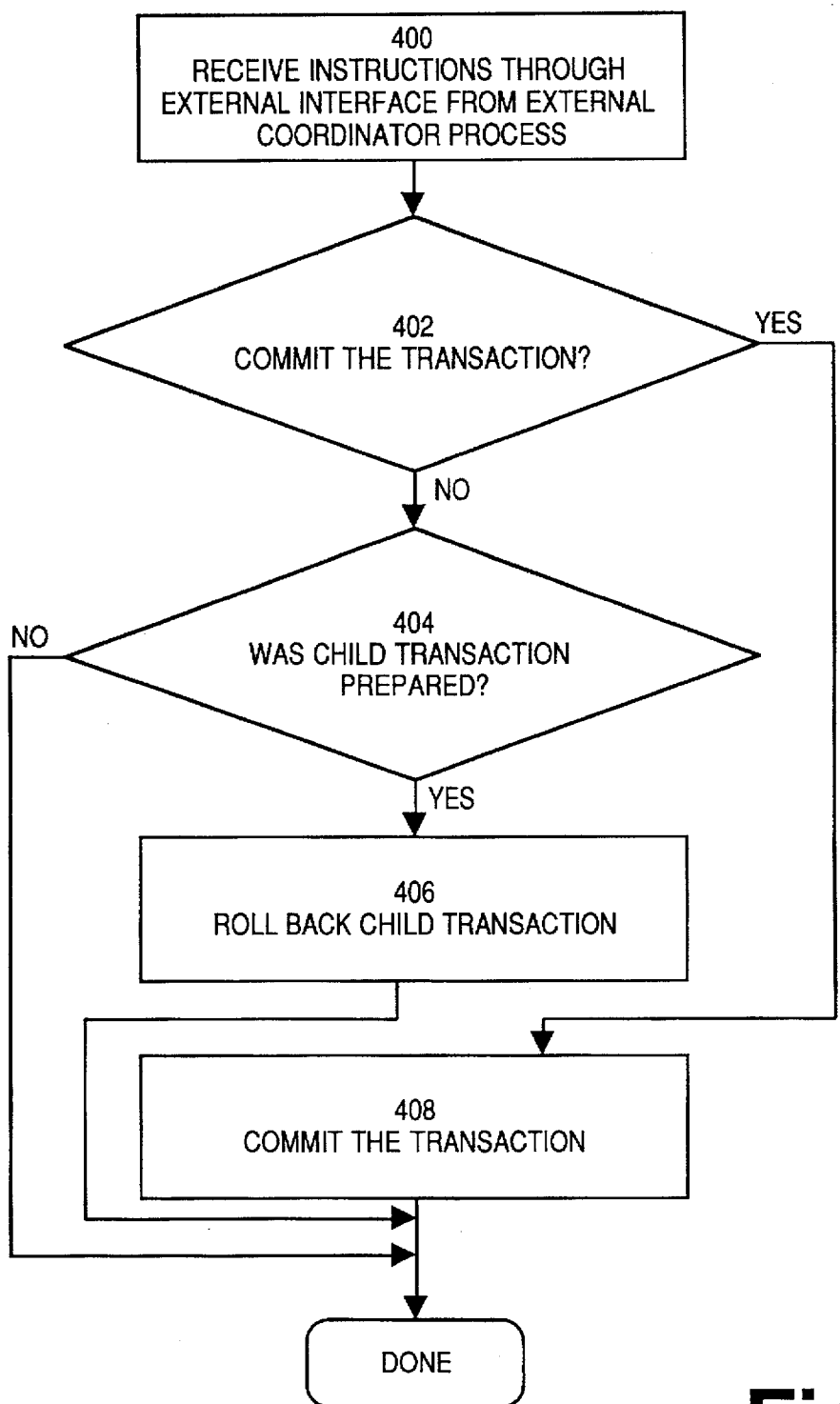
FIG. 4 is a flow chart illustrating steps performed by one database instance related to externally initiated distributed transactions that existed in another database instance that has crashed.

When a database instance that was responsible for executing a child transaction has crashed, the database instance will not be available to commit or rollback the child process in response to instructions from the external coordinator process. According to one embodiment of the present invention, a different database instance that has access to the same database as the crashed instance responds to the instructions issued by the external coordinator process. In the present example, database instance 104 responds to instructions from external coordinator process 122 relating to transaction 108 even though transaction 108 belonged to database instance 102. FIG. 4 illustrates the steps performed by database instance 104 in response to such instructions from external coordinator process 122.

Referring to FIG. 4, at step 400, database instance 104 receives instructions for a particular distributed transaction through external interface 124 from external coordinator process 122. For the purposes of explanation, it shall be assumed that the instructions relate to transaction 108. If the instruction is to commit transaction 108, control passes from step 402 to step 408. If the instruction is to roll back transaction 402, control passes from step 402 to step 404.

At step 404, database instance 104 determines whether transaction 108 was prepared. Database instance 104 makes this determination by inspecting the prepared transaction information for database instance 102 that is stored in database 110. If transaction 108 was not prepared, it will not be listed in the prepared transaction information, and no further operation is required. Under these circumstances, transaction 108 would have already been scheduled for rollback with the other transactions that were active in database instance 102 at the time of the crash (step 212 of FIG. 2).

If transaction 108 was prepared at the time of the crash, database instance 104 rolls back transaction 108 at step 406 or commits the transaction 108 at step 408 according to the instructions from the external coordinator process 122. Optionally, database instance 104 may remove the information about transaction 108 from the prepared transaction information in response to rolling back or committing transaction 108.

In the foregoing specification, the invention has been described with reference to specific embodiments thereof. It will, however, be evident that various modifications and changes may be made thereto without departing from the broader spirit and scope of the invention. For example, the invention has been described with reference to two database instances with access to a particular database. However, there may be any number of database instances with access to the database. In addition, the database instance that performs proxy reporting and recovery for a crashed instance does not have to be coterminous with the crashed instance. For example, a database instance that begins execution after the crashed instance may perform proxy reporting and recovery for the crashed instance. The specification and drawings are, accordingly, to be regarded in an illustrative rather than a restrictive sense.

What is claimed is:

1. A method for recovering after a crash of a first database instance that had access to a particular database, the method comprising the steps of:

storing prepared transaction information on a storage device, said prepared transaction information identifying any distributed transactions that had been prepared by said first database instance prior to when said crash occurred;

responding to a status request issued by an external coordinator process by causing a second database instance to perform the steps of reading said prepared transaction information from said storage device; and sending a message to said external coordinator process that identifies at least one distributed transaction that had been prepared by said first database instance prior to when said crash occurred.

2. The method of claim 1 further comprising the step of causing said second database instance to receive from said external coordinator process instructions relating to a distributed transaction that existed in said first database instance.

3. The method of claim 2 further comprising the step of causing said second database instance to respond to said instructions by inspecting said prepared transaction information to determine whether said distributed transaction was prepared when said first database instance crashed;

performing an action indicated by said instructions if said distributed transaction was prepared when said first database instance crashed.

4. The method of claim 3 wherein the step of performing an action includes rolling back changes made by said distributed transaction.

5. The method of claim 3 wherein the step of performing an action includes committing changes made by said distributed transaction to said particular database.

6. The method of claim 1 wherein:

at least a portion of said particular database resides on said storage device; and the step of storing prepared transaction information includes storing said prepared transaction information into said portion of said particular database.

7. The method of claim 1 further comprising the steps of:

causing said second database instance to determine whether said prepared transaction information has been completely copied to said storage device; and if said prepared transaction information has not been completely copied to said storage device, then causing said second database instance to wait for said prepared transaction information to be completely copied to said storage device before performing the step of reading said prepared transaction information.

8. A computer system comprising:

storage upon which is stored a database;

a first database instance executing on one or more nodes;

a second database instance executing on one or more nodes;

an external coordinator process executing on one or more nodes, said external coordinator process assigning to said first database instance a child transaction that makes changes to said database;

said first database instance crashing after preparing said child transaction;

a transaction recovery mechanism that stores in said database prepared transaction information that identifies prepared transactions that existed in said first database instance;

said external coordinator process requesting status information from said second database instance; and said second database instance responding to said external coordinator process by reading said prepared transaction information from said database and indicating to said external coordinator process that said child transaction was prepared.

9. The computer system of claim 8 wherein said transaction recovery mechanism is part of said second database instance.

10. The computer system of claim 8 wherein said external coordinating process communicates to said first database instance and said second database instance through an external interface.

11. The computer system of claim 8 wherein:

said transaction recovery mechanism identifies transactions that were active in said first database instance when said first database instance crashed; and said transaction recovery mechanism does not roll back any changes made by said transactions that were active until said transaction recovery mechanism stores said prepared transaction information in said database.

12. The computer system of claim 8 wherein:

said second database instance determines whether said transaction recovery mechanism has completely stored said prepared transaction information in said database; and said second database instance does not respond to said external coordinator process until said transaction recovery mechanism has completely stored said prepared transaction information in said database.

13. The computer system of claim 8 wherein:

said external coordinator process assigns to said first database instance a second child transaction that makes changes to said database;

said first database instance crashes after preparing said second child transaction; and said external coordinator process sends a status request to said second database instance that includes a flag;

if said flag has a first value, said second database instance may respond to said status request without indicating that said second child transaction was prepared; and if said flag has a second value, said second database instance responds to said status request indicating that said second child transaction was prepared.

14. The computer system of claim 13 wherein said second database instance does not respond to said status request until said transaction recovery mechanism has all of said prepared transaction information in said database.

* * * * *